May 7, 1946.  L. F. CLERC  2,399,787
PORTABLE REFRIGERATING DEVICE FOR TRAVELERS
Filed Nov. 16, 1942  2 Sheets-Sheet 1

INVENTOR.
Leonard F. Clerc
BY Edward M. Apple
ATT'Y

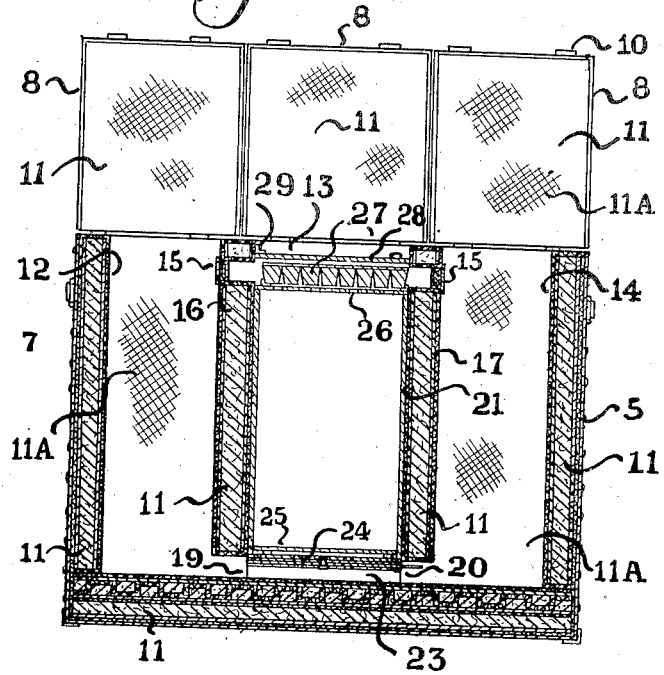
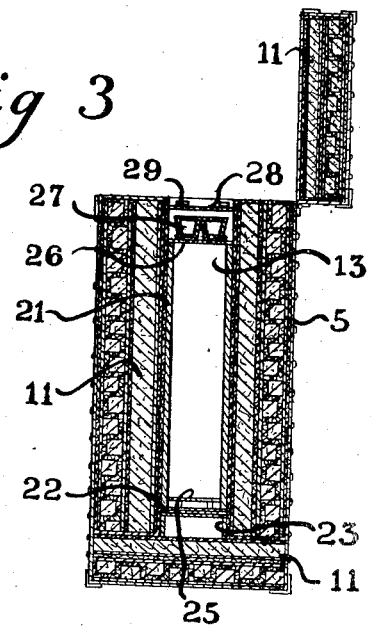

Patented May 7, 1946

2,399,787

UNITED STATES PATENT OFFICE 2,399,787

PORTABLE REFRIGERATING DEVICE FOR TRAVELERS

Leonard F. Clerc, Chicago, Ill.

Application November 16, 1942, Serial No. 465,657

6 Claims. (Cl. 62—91.5)

This invention relates to refrigerating devices and has particular reference to a portable "Dry Ice" refrigerator, which may be used by tourists, hunters, and fishermen, and for the shipment of frozen foods, serums and the like.

An object of the invention is to provide a portable "Dry Ice" refrigerator which is simple in construction, light in weight, economical to manufacture, and efficient in use.

Another object of the invention is the provision of a device of the character referred to, which has a readily accessible compartment with removable trays for making wet ice cubes, which compartment is independent of the storage compartments of the device.

Another object of the invention is the provision of a device of the character referred to which is provided with several compartments and means to regulate the temperature in the respective compartments.

Another object of the invention is the provision of a "Dry Ice" refrigerating device which is provided with means for evenly diffusing the $CO_2$ gas through the interior of the device.

Other objects and advantages appear as the description proceeds, reference being made from time to time to the accompanying drawings, in which:

Fig. 2 is a sectional view taken substantially on the line 2—2 of Fig. 1.

Fig. 3 is a sectional view taken substantially on the line 3—3 of Fig. 1.

Figure 1:
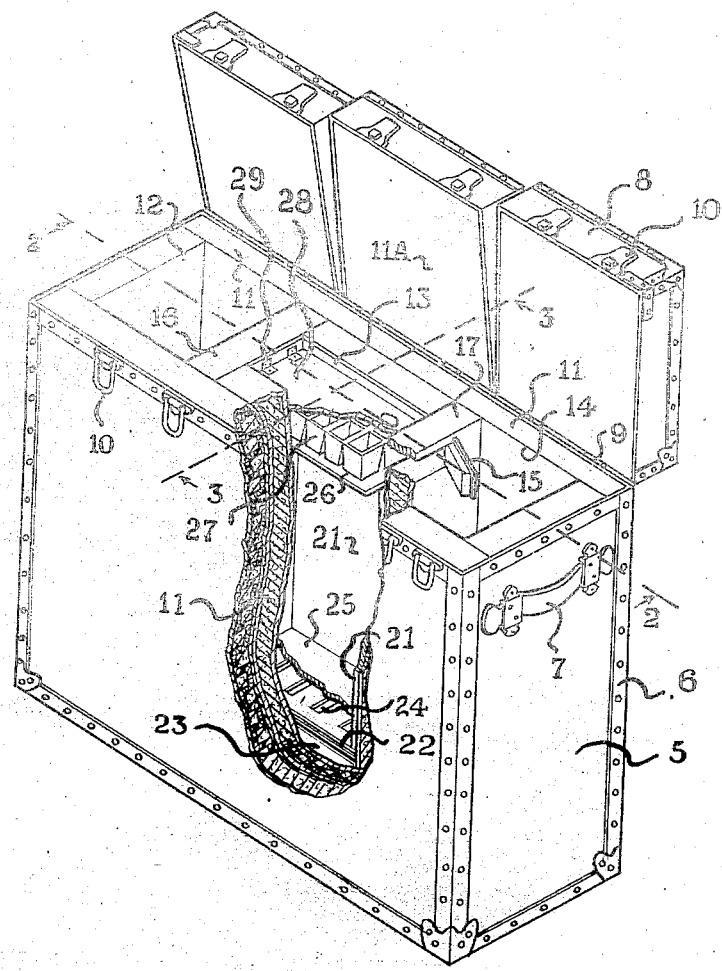
Fig. 1 is a perspective view of a device embodying my invention.

Referring now more particularly to the drawings it will be understood that in the embodiment herein disclosed, my device consists of a trunk-like container 5, made of a tough fibrous material, reinforced at the corners and edges as at 6, and provided with carrying handles 7. The trunk 5, is provided with a three section lid 8, each section being hinged as at 9, and provided with locking means 10.

The container or trunk 5, and the lids 8 are lined with insulating pads 11, which are constructed and assembled as taught in my co-pending application, S. N. 441,431, filed May 2, 1942. These pads 11, are covered with canvas 11A and are secured in position by gluing or other suitable means. The pads 11 are comparatively resilient which enables them to be compressed somewhat to effect a seal.

It will be seen that the interior of the trunk 5 is divided into three compartments 12, 13, and 14, each provided with a lid section 8. The compartments 12 and 14 are adapted to serve as food storage compartments, and the compartment 13 is arranged to accommodate the solid refrigerant, preferably "Dry Ice."

Small doors 15, at the top of the partitions 16 and 17, open to permit communication between the compartments, so that $CO_2$ gas from the solid refrigerant may freely circulate. Similar openings 19 and 20 (Fig. 2) are provided in the bottom of the partitions 16 and 17.

The inside of the compartment 13 is preferably lined with thin sheets of plastic 21, which serve to protect the partitions 16 and 17, and lining pads 11 against damage when the "Dry Ice" is inserted.

The sheets of plastic 21 rest upon the control panel 22, which in turn rests on narrow strips of plastic 23, which are positioned on edge longitudinally on the bottom of the compartment 13. The control panel 22 consists of several layers of plastic one of which is longitudinally adjustable. The layers of plastic are slotted as at 24 which slots may be opened and closed by the movement of one layer with reference to the other. A "Dry Ice" platform 25 is held in spaced relation above the panel 22 and serves as a rest for the "Dry Ice" refrigerant.

A perforated shelf 26 is supported by the upper edges of the plastic sheets 21, which line the inside of the compartment 13. The shelf 26 is adapted to support removable wet ice trays 27. The ice trays 27 are covered by a lid 28 which is hinged as at 29.

To use the device the compartments 12 and 14 are filled with frozen food or other commodities to be stored and the control is set to get the proper circulation of $CO_2$ gas. The "Dry Ice" is then inserted and the shelf 26 and ice trays 27 are inserted. The lids 28 and 8 are then closed and locked and the device is ready for use.

With this device I have been able to maintain the temperature in the compartments 12 and 14 at 40° for about three days with approximately 25 pounds of "Dry Ice." By opening the small doors 15, I can reduce the temperature in its compartment to 0° if desired.

Having described my invention, what I claim and desire to secure by Letters Patent is:

1. In a trunk, the combination of a plurality of insulated compartments, one of said compartments being adapted to hold a solid refrigerant such as Dry Ice, and the other compartments being adapted to hold food and the like, said compartments being in communication with one another through controlled passageways, and the refrigerant compartment being provided at its bottom with a slotted panel adapted to control the flow of $CO_2$ gas from the refrigerant.

2. In a trunk, the combination of a plurality of insulated compartments, one of said compartments being adapted to hold a solid refrigerant such as Dry Ice, and the other compartments being adapted to hold food and the like, said compartments being in communication with one another through controlled passageways, the refrigerant compartment being provided at its bottom with a slotted panel adapted to control the flow of $CO_2$ gas from the refrigerant, and said panel is provided with a spaced platform adapted to support the solid refrigerant.

3. In a trunk, the combination of a plurality of insulated compartments, one of said compartments being adapted to hold a solid refrigerant, such as Dry Ice, and the other compartments being adapted to hold food and the like, said compartments being in communication with one another through controlled passageways, and the refrigerant compartment being provided at its bottom with a slotted panel adapted to control the flow of $CO_2$ gas from the refrigerant, there being a perforated shelf at the upper end of said refrigerant compartment adapted to support wet ice trays.

4. In a trunk, the combination of a plurality of insulated compartments, one of said compartments being adapted to hold a solid refrigerant, such as Dry Ice, and the other compartments being adapted to hold food and the like, said compartments being in communication with one another through controlled passageways, the said compartments being lined with comparatively resilient insulating pads, and each compartment is provided with an independent lid, each lid having a similar resilient lined pad, and means to lock the lid pad in air-tight position over the liner pads of the compartment.

5. In a trunk, the combination of a plurality of insulated compartments, one of said compartments being adapted to hold a solid refrigerant such as Dry Ice, and the other compartments being adapted to hold food and the like, said compartments being in communication with one another through controlled passageways, the compartments being lined with comparatively resilient insulating pads, and each compartment is provided with an independent lid, each lid having a similar resilient liner pad, and means to lock the lid pad in air-tight position over the liner pads of the compartment, there being an ice tray positioned in the upper part of said refrigerant compartment, and an intermediate lid for covering said ice trays.

6. In a trunk, the combination of a plurality of insulated compartments, one of said compartments being adapted to hold a solid refrigerant such as Dry Ice, and the other compartments being adapted to hold food and the like, said compartments being in communication with one another through controlled passageways, the compartments being lined with comparatively resilient insulating pads, and each compartment is provided with an independent lid, each lid having a similar resilient liner pad, and means to lock the lid pad in air-tight position over the liner pads of the compartment, there being an ice tray positioned in the upper part of said refrigerant compartment, and an intermediate lid for covering said ice trays, and doors in the walls of the refrigerant compartment at either end of said ice trays and in alignment with said ice trays.

LEONARD F. CLERC.